United States Patent [19]

Pemberton et al.

[11] 4,078,430

[45] Mar. 14, 1978

[54] DUAL LIQUID LEVEL INDICATING GAUGE

[75] Inventors: Eugene B. Pemberton, Fairfield; Norman T. Allen, Cincinnati, both of Ohio

[73] Assignee: Dover Corporation, New York, N.Y.

[21] Appl. No.: 665,159

[22] Filed: Mar. 8, 1976

Related U.S. Application Data

[63] Continuation of Ser. No. 466,238, May 2, 1974, abandoned, and a continuation-in-part of Ser. No. 328,535, Feb. 1, 1973, abandoned.

[51] Int. Cl.² ............................................. G01F 23/06
[52] U.S. Cl. .......................................... 73/311; 73/321
[58] Field of Search .................................. 73/311, 321

[56] References Cited

U.S. PATENT DOCUMENTS

| | | |
|---|---|---|
| 1,652,377 | 12/1927 | Sartakoff .................................. 73/321 |
| 1,801,212 | 4/1931 | Star ........................................ 73/321 |
| 1,977,434 | 10/1934 | Eynon ..................................... 73/321 |
| 3,217,541 | 11/1965 | Williamson ............................ 73/321 |
| 3,792,331 | 2/1974 | Wissmiller et al. ..................... 73/304 |

FOREIGN PATENT DOCUMENTS 798,790  7/1958  United Kingdom ................... 73/321

*Primary Examiner*—Herbert Goldstein
*Attorney, Agent, or Firm*—John G. Schenk

[57] ABSTRACT

An indicating gauge has dual floats to measure the levels of two liquids contained in the same tank. A separate measuring tape is controlled by each float to provide an indication of the liquid level through a single viewing window above the tank. In certain situations, a single float and measuring tape is used to provide an indication of the level of one liquid within the tank. A wiper is engageable with the viewing window to permit cleaning of the inside surface of the window.

18 Claims, 12 Drawing Figures

DUAL LIQUID LEVEL INDICATING GAUGE

This is a continuation of application Ser. No. 466,238 filed May 2, 1974, now abandoned and a continuation in part of No. 328,535, filed Feb. 1, 1973 now abandoned.

BACKGROUND OF THE INVENTION

This invention relates generally to gauges and more particularly to an indicating gauge to provide an indication of the level of fluid within a closed container.

Frequently two liquids of different specific gravities will be contained within the same container or tank. This may not always be by design, such as will occur in underground gasoline storage tanks. For instance, water may accumulate within the underground storage tank so that there will be water and gasoline contained in the tank. There is no readily available apparatus to determine the respective levels of the two liquids in a tank. In the past, it has been necessary to open a cover to the underground tank and insert a calibrated pole therein to determine the upper level of the gasoline. This, however, does not provide an indication of the interface level between the water and gasoline. In addition, when opening the cover to make such a level check, fumes from the enclosed tank will escape into the atmosphere which contribute to the ever increasing problem of air pollution. There are numerous float gauges available but none which will provide an accurate dual indication of the upper liquid level and interface level. Prior floats used in these gauges have been subject to joint leakage, etc., such that the accuracy is not reliable.

Accordingly, it is an object of this invention to provide an indicating gauge which will provide a measurement of the surface level of a first liquid and the interface level existing between the first liquid and a second liquid of different specific gravity.

Another object of this invention is to provide an indicating gauge which will permit a liquid level check of an underground tank without opening the tank to atmosphere.

A still further object of this invention is to provide an indicating gauge having accurate system response to changes in respective liquid levels.

And yet another object of this invention is to provide an indicating gauge which is of simple and economical construction and is readily insertable into and removable from existing underground tanks.

And still another object of this invention is to provide an indicating gauge having dual pivoted floats which permit the insertion of the gauge in a narrow inlet yet will permit the floats to rotate in the liquid to provide maximum float energy for the system.

A still further advantageous object of this invention is to provide an indicating gauge which is readily adaptable for either dual level indications or single level indication.

Another object of this invention is to provide an indicating gauge in which the sight glass is wipable from the interior of the tank so as to present a clear viewing area.

A still further object of this invention is to provide an indicating gauge having improved system stability in turbulent conditions and in situations where conditions may cause the riser pipe to be not in a true plumb condition.

SUMMARY OF THE INVENTION

This invention provides an improved liquid level indicating gauge which will indicate the level of liquids within a single container or tank. In one embodiment the gauge includes a pair of indicating tapes, each controlled by a separate float, each float being responsive to the level of one of the liquids within the tank. Means are provided to maintain the tapes substantially taut while suspended in the tank. Viewing means are provided to permit inspection of both tapes. In a second embodiment a single float and tape are used. Wiping means is engageable with the viewing means to permit cleaning of the viewing means.

Other objects, details, uses and advantages of this invention will become apparent as the following description of an exemplary embodiment thereof presented in the accompanying drawings proceeds.

BRIEF DESCRIPTION OF THE DRAWINGS

The accompanying drawings show present exemplary embodiments of this invention in which:

FIG. 3 is a top view of the body and cap subassembly with the cap opened to view of the upper pulley assembly;

FIG. 4 is a sectional view taken on line 4—4 of FIG. 2;

DESCRIPTION OF ILLUSTRATED EMBODIMENT

Figure 1:
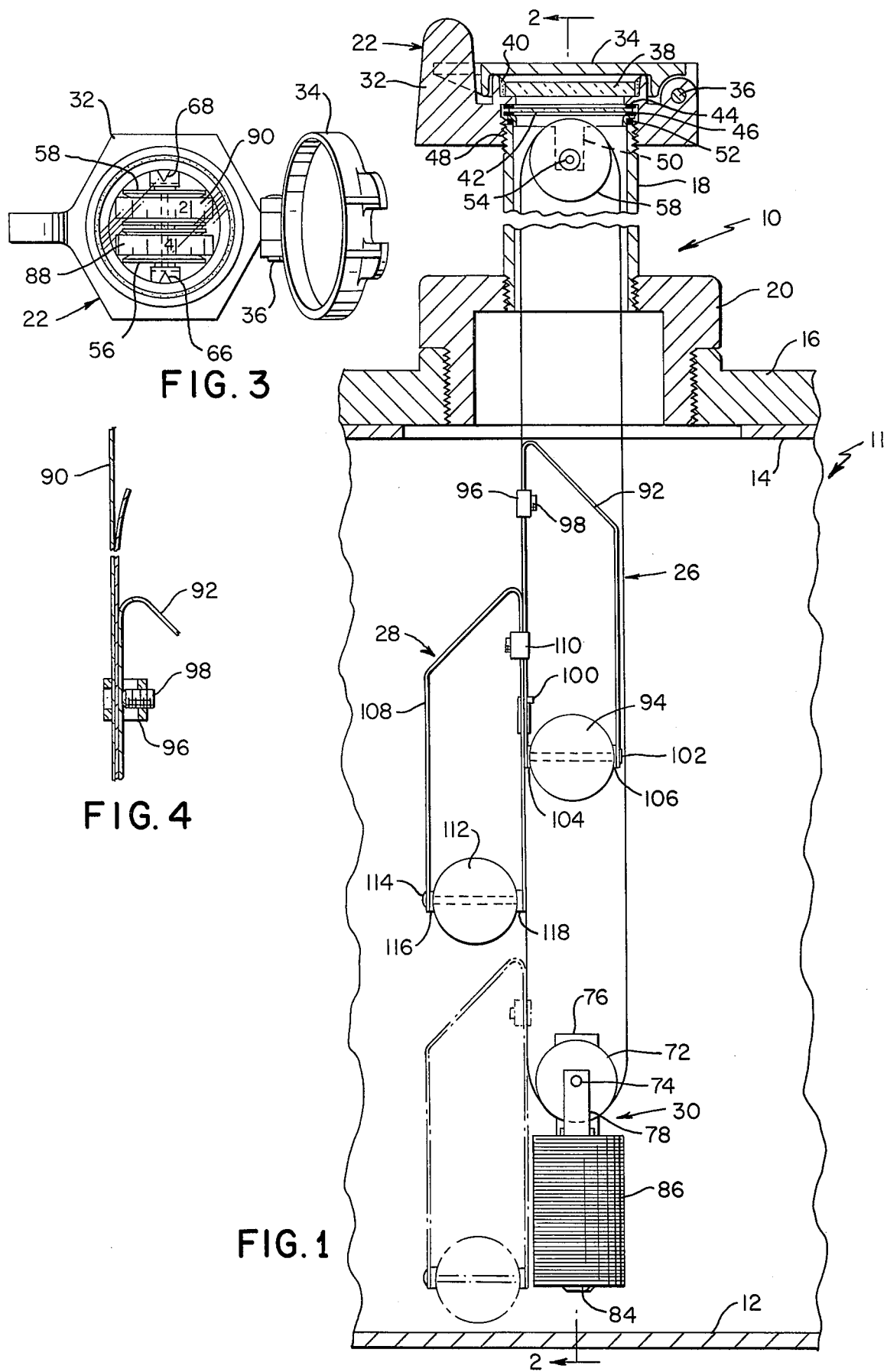
FIG. 1 is an elevation view of the indicating gauge of one embodiment of this invention mounted in a tank.
Figure 2:
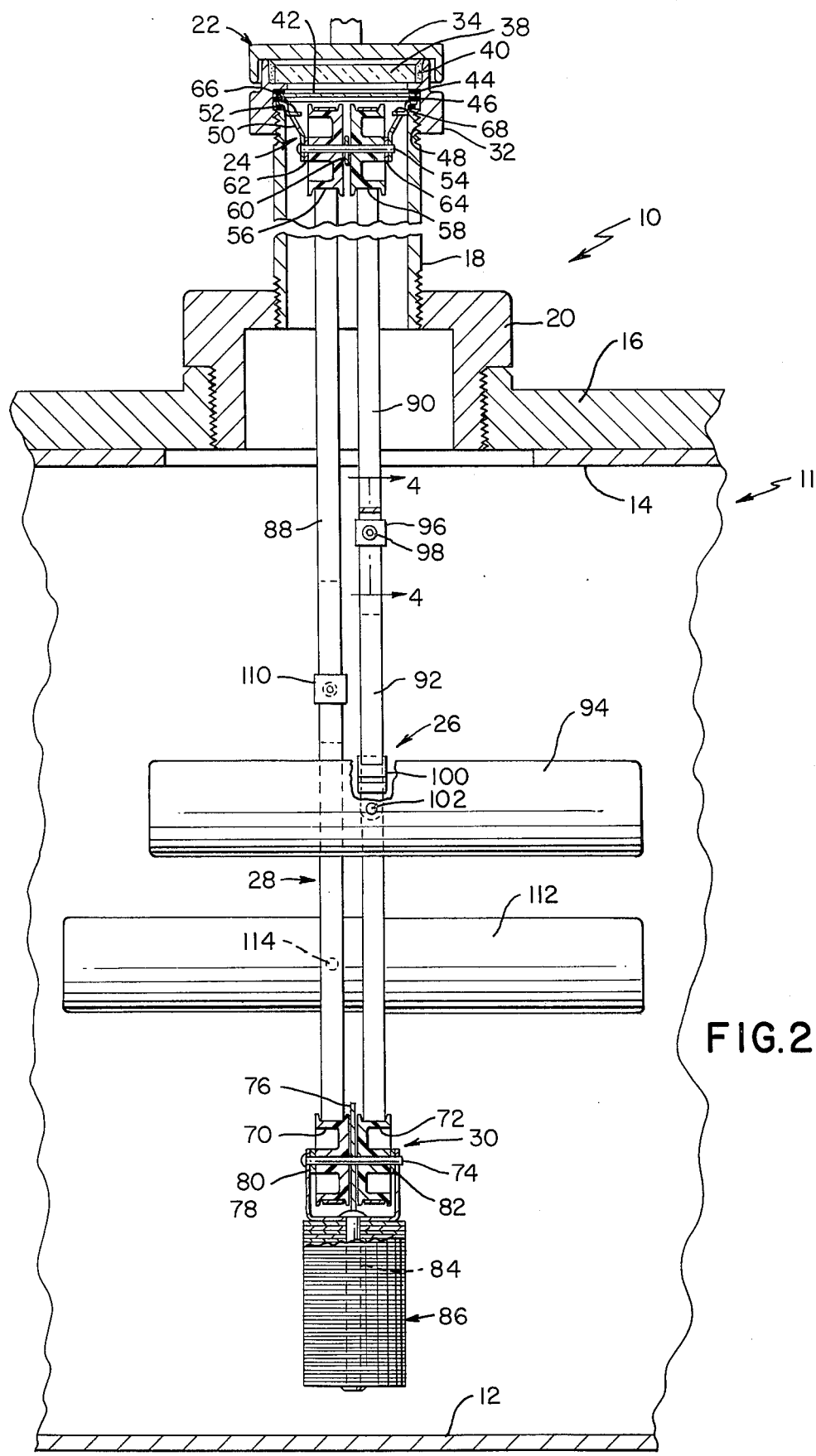
FIG. 2 is a sectional view taken along line 2—2 of FIG. 1.

Reference is now made to FIGS. 1 and 2 of the drawings which illustrate one exemplary embodiment of the improved level indicating gauge of this invention, which is designated generally by the reference numeral 10. For illustrative purposes only, the description of the indicating gauge 10 will be directed to a particular use in an underground gasoline storage tank designated generally as 11 having a top 14. A threaded bushing 16 is secured by suitable means to the tank top 14 to provide the opening into the tank. A suitable pipe riser 18 and fitting 20 are threadably mounted to the bushing 16 to provide access to the tank from ground surface.

The indicator gauge 10 is comprised generally of a body and cap subassembly, an upper pulley subassembly, a gasoline float and bail subassembly, a water float and bail subassembly, and a lower pulley subassembly, each respectively designated generally as 22, 24, 26, 28 and 30.

The body and cap subassembly 22 is comprised of a body 32 to which a cap 34 is pivotally mounted by a suitable pivot pin or rivet 36. A transparent element such as an unbreakable plastic or glass 38 is mounted in the body 32 and held in place by any suitable means such as epoxy or the like 40. A sight disc of plastic or the like 42 is mounted in the body 32 below the glass 38. The sight disc 42 is held in place by suitable seals or gaskets 44 and 46. These gaskets may be any suitable material such as buna-N or the like. In the particular environment herein described. i.e., a gasoline storage tank, buna-N is particularly suitable since it is not deteriorated by gasoline fumes. It would be obvious that if other fluids were used, different types of seals and gaskets could be used.

The body 32 is internally threaded at 48 so as to threadably engage complemental threads on the riser 18.

The upper pulley subassembly 24 is carried by the upper end of the riser 18 and is comprised of an upper bracket 50. The bracket 50 is mounted between the gasket 46 and a seal or gasket 52 of buna-N on the end of the riser 18. Thus, the upper bracket 50 is secured in place and sealed when the body 32 is secured in place when the body 32 is screwed onto the riser 18. A pin or rivet 54 is secured to the lower arms of bracket 50 on which rotatable pulleys 56 and 58 are freely rotatable about the rivet 54 and are separated one from the other for independent movement by a suitable separator, washer or the like 60. Likewise, washers 62 and 64 are mounted between each pulley and the supporting bracket arms. The washers may be made of any suitable material which has low friction qualities such as nylon or the like. As best seen in FIGS. 2 and 3, the bracket 50 is formed with a pair of index pointers 66 and 68, the purpose of which will be explained hereinbelow.

The lower pulley subassembly 30 includes a similar pair of pulleys 70 and 72 mounted for rotatable movement about a pin or rivet 74. The pulleys 70 and 72, as well as pulleys 56 and 58 may be made of any suitable material such as acetal plastic or the like. The pulleys 70 and 72 are separated by a separator or washer 76 so that each is freely rotatable relative to the other. The rivet 74 is mounted in a lower bracket 78 and nylon washers or the like 80 and 82 separate each pulley from the bracket. A rivet 84 is supported by the bracket 78 and extends therebelow. A plurality of suitable weights such as disc washers 86 is carried by the rivet 84 to provide the necessary weight to maintain tapes 88 and 90 taut within the tank. The tapes 88 and 90 are carried by the pulleys 56 and 70 and 58 and 72, respectively. For calibration purposes, it is desirable that there be a one inch clearance between the bottom of the washers 86 and the tank bottom 12. This will also insure that the proper tension will always be maintained on the tapes so as to permit an accurate level indication.

Referring now to FIGS. 1 and 2, the gasoline float and bail subassembly 26 is shown to be mounted inside the loop formed by tape 90. The subassembly 26 comprises a mounting bracket or bail 92 on which a float 94 is carried. The bail 92 is secured and carried by the tape 90 by a suitable tape lock clamp 96. As seen in FIG. 4, the ends of the tape 90 are fed through the lock clamp 96 and the bail 92 positioned therealong until the proper dimension of the tape 90 is positioned adjacent the index pointer 68. At this point, the bail 92 is secured in place by tightening the set screw 98 of the lock clamp 96.

A second clamp 100 secures the bail 92 to the tape 90 to prevent the float 94 from unnecessary movement within the tank. The float 94 is pivotally mounted to the bail 92 by a suitable pivot pin or rivet 102. Washers 104 and 106 are mounted about the rivet 102 on either side of the float 94 to insure freely rotatable movement of the float relative to the bail 92.

It should be noted that the float 94 is in the form of an elongated cylindrical section of a molded closed-cell buna-N rubber. As particularly seen in FIG. 2, the pivot point of the float 94 is linearly displaced in an axial direction along the center of gravity of the float 94. Thus, the float 94 will rotate about rivet 102 to a vertical attitude in air which facilitates insertion and extraction of the unit through the narrow diameter riser 18.

The water float and bail subassembly 28, FIGS. 1 and 2, are very similar to the float and bail assembly 26 hereinabove described. The bail 108 is secured to the outside of the tape loop defined by tape 88 by the tape lock clamp 110 as described hereinabove. A water float 112 is pivotally supported on the bail 108 by rivet 114. Nylon washers or the like 116 and 118 carried by the rivet 114 permit free rotational movement of the float 112 relative to the bail 108. As indicated above, the float 112 is pivotally mounted so as to rotate to a vertical attitude in the air. The composition of the float 112 is similar so that of the float 94 in that it is a closed cell buna-N rubber material. However, the specific gravity of the float 112 is greater than that of the float 94 such that float 112 will sink in gasoline and will float in water. Thus, the float 112 will assume a floating position at the interface level between the water and gasoline. The bail 108 is secured to the tape 88 by only a single clamp 110 such that the subassembly 28 can descend to the position shown in phantom in FIG. 1 wherein the float 112 is adjacent the tank bottom 12.

In operation, the indicator gauge 10 is assembled exteriorly of the tank 11. A dip stick or the like is used to measure the exact dimensions of the tank and level of the gasoline therein. With these dimensions, the bails 92 and 108 are secured to the respective tapes 90 and 88 and precisely aligned to insure that the proper dimension of the tape is adjacent the index pointers 66 and 68. The indicating gauge is then inserted through the riser 18 with the lower pulley subassembly 30 being inserted first. The float and bail subassemblies 26 and 28 are positioned near the upper pulley subassembly 24. The operator slowly lowers the lower pulley subassembly 30 into the tank 11 by holding and guiding the tapes 88 and 90. The water float and bail assembly 28 are then lowered through the riser 18, the float 112 being rotated to the vertical position. The gasoline float and bail subassembly 26 is lowered through the riser 18 after the water float 112 is totally submerged in any existing gasoline. The upper pulley subassembly 24 is then installed on the end of the riser 18 and oriented so as to identify both tapes 88 and 90 to suit convenient reading and also to avoid confusion as to which tape reads the water level and which tape reads the gasoline level. The body and cap subassembly 22 is then secured to the riser 18 and positioned so that the index pointers 66 and 68 are in line with the rivet 54 (FIG. 3). Thus, the index pointers provide an accurate reference reading on the respective tapes 88 and 90. The indicating gauge 10 may be removed in a similar manner, i.e., each float and subassembly is removed sequentially. With the indicating unit in position, the floats 94 and 112 will assume the horizontal position in the respective liquids, as seen in FIG. 2. The float 94 will assume a position on the surface of the gasoline thereby causing the tape 90 to rotate about pulleys 58 and 72. The position of the float 94, i.e., the height of the gasoline, may be read on the tape 90 opposite the index pointer 68. The water float 112 will assume a floating position at the interface level between the water and gasoline and thereby providing a height indication of the water within the tank, as indicated by the tape 88 reading opposite the index pointer 66. As the level of either liquid varies, the respective float will be raised or lowered which will provide a corresponding movement of the respective tape. Thus, an accurate reading of the heights of both liquids may be obtained at any time by merely raising the cap 34 and reading the dimensions of the respective tape opposite the index pointers.

Figure 5:
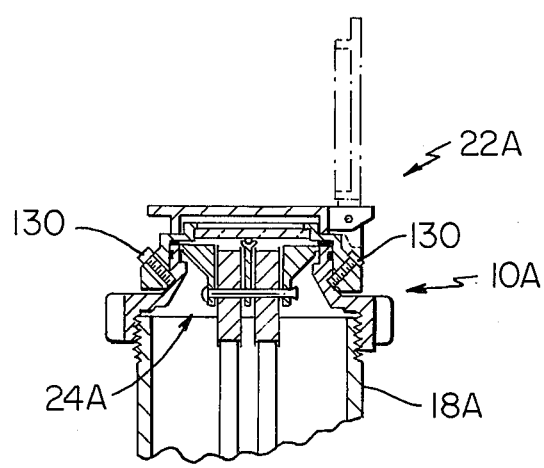
FIG. 5 is a sectional view of another embodiment of the present invention particularly showing new improved body and cap subassembly and upper pulley subassembly.

Another exemplary embodiment of this invention is illustrated in FIG. 5 of the drawings in which the body and cap subassembly and upper pulley subassembly are illustrated. The apparatus illustrated in FIG. 5 is very similar to the embodiment shown and described hereinbefore. Therefore, such gauge will be designated generally by the reference 10A and parts of the guage 10A which are very similar to corresponding parts of the gauge 10 will be designated by the same reference numeral as the indicating gauge 10 also followed by the letter designation "A" and not described again. The main difference between the indicating gauge 10A and the indicating gauge 11 is in the body and cap subassembly 22A, and the upper bracket or pulley subassembly 24A.

Figure 6:
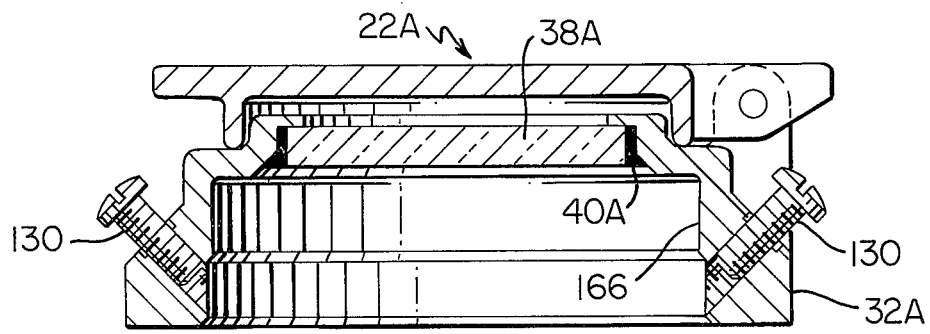
FIG. 6 is a sectional view of the body and cap subassembly.
Figure 7:
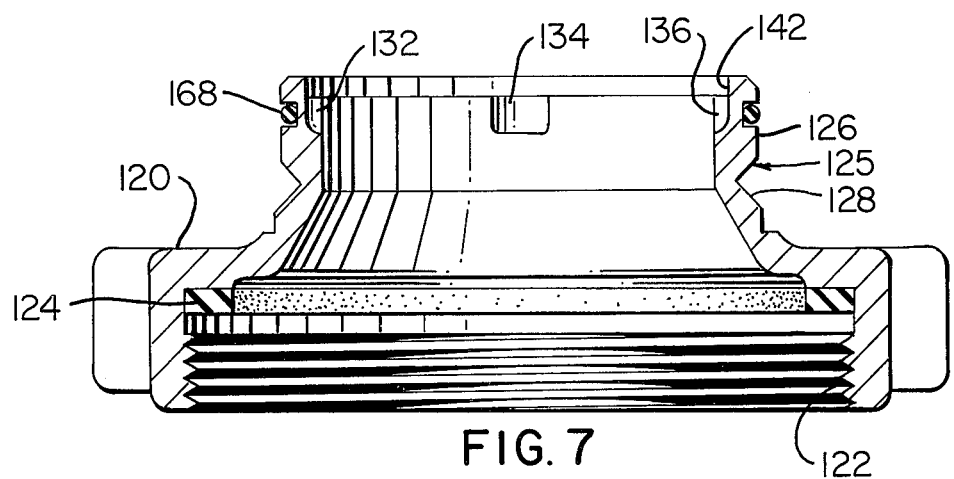
FIG. 7 is a sectional view of the adapter body.
Figure 8:
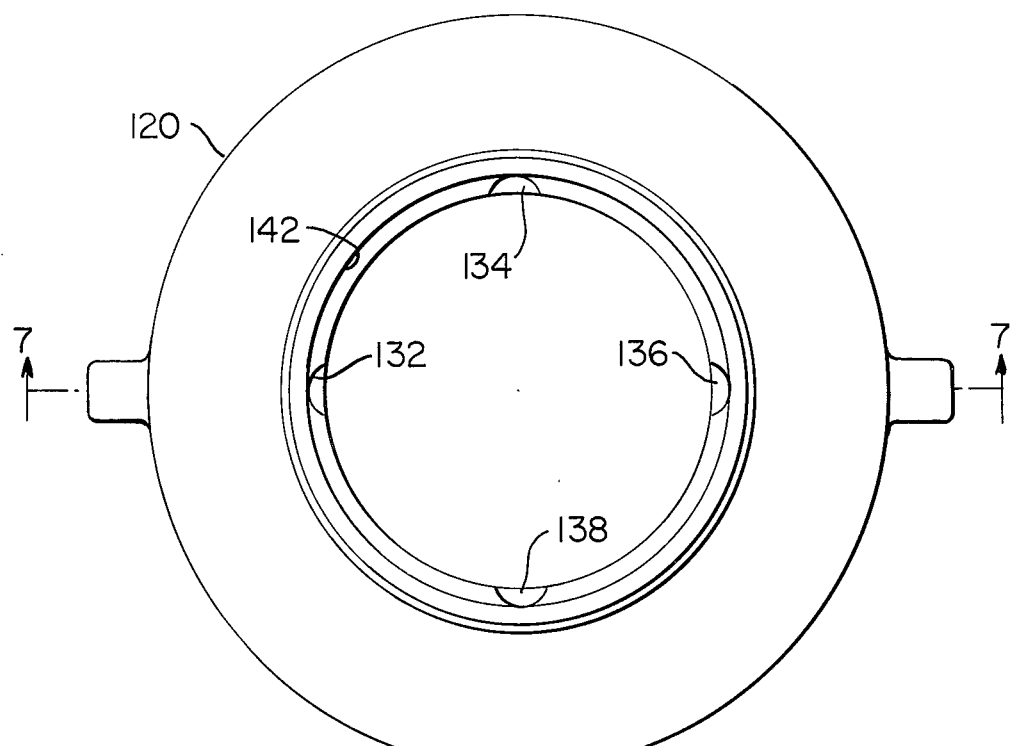
FIG. 8 is a top view of the adapter body of FIG. 7.

Referring now to FIG. 7, it is seen that an adapter body 120 is shown in sectional form. The adapter body is internally threaded at 122 for cooperating engagement and mounting on a similarly threaded riser pipe 18A (FIG. 5). Suitable gasket 124 forms a leakproof seal with the end of the riser pipe 18A when the adapter body 120 is threaded to the pipe. The adapter body 120 is formed with an annular channel 125 about the neck 126. The annular channel 125 provides a flat surface 128 which serves as a race for a pair of screws or the like 130 (FIG. 6) of the subassembly 22A. The internal bore of the neck 126 is formed with 4 grooves or channels 132, 134, 136 and 138 at the end thereof as best seen in FIGS. 7 and 8.

Figure 9:
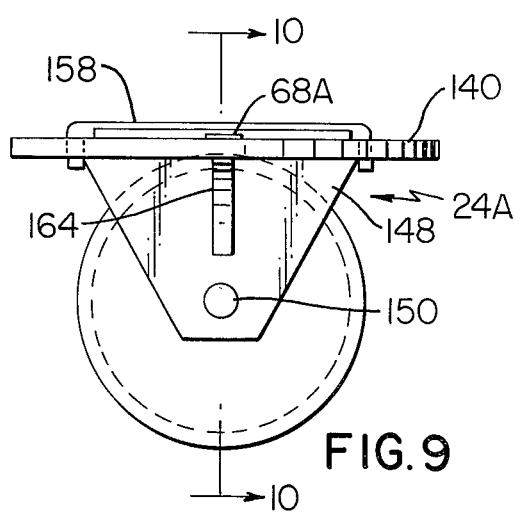
FIG. 9 is a side elevational view of the upper pulley subassembly.
Figure 10:
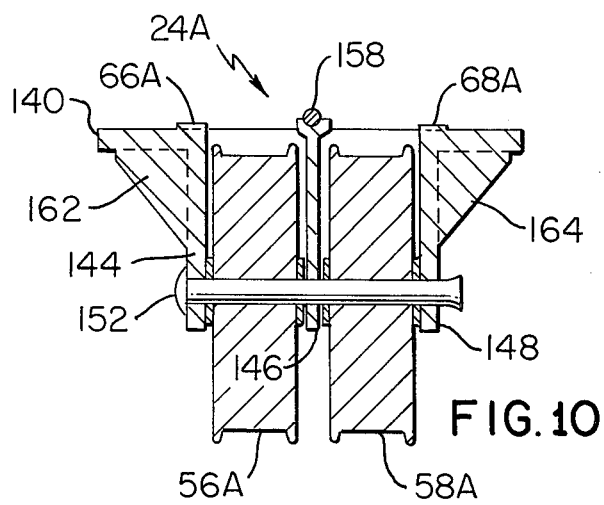
FIG. 10 is a sectional view taken along the line 10—10 of FIG. 9.
Figure 11:
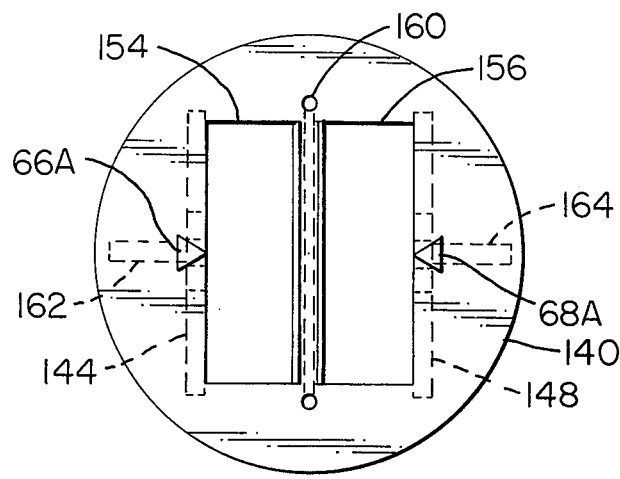
FIG. 11 is a top view of the upper bracket of FIG. 9.

Referring now to FIGS. 9-11, the upper pulley subassembly 24A is seen to be constructed somewhat differently from the subassembly 24 hereinabove described. The subassembly 24A is formed of a suitable material which is resistant to the gasoline fumes such as plastic or the like. The subassembly 24A is comprised of an upper bracket 140 which is circular in shape and of a diameter which will fit within the internal diameter of the bore portion 142 of the adapter neck 126 (FIG. 7). Depending downwardly from the upper bracket 140 are three legs 144, 146 and 148. As seen in FIG. 9, the legs 144-148 are of a generally trapezoidal shape. Each of the legs 144-148 is formed with an aperture 150 therethrough through which a rivet or the like 152 may be inserted. In the illustrative embodiment shown, a pair of pulleys 56A and 58A is mounted on the pivot 152. Suitable washers are mounted about the pivot pin 152 and serve as spacers between the pulleys and respective support legs in a well-known manner. Although in the present embodiment a pair of pulleys is illustrated, it is apparent that only one pulley is required if the indicating gauge is to be used for only providing a height measurement for a single liquid.

The upper bracket 140 is formed with a pair of substantially rectangular aperture 154 and 156 through which the indicating tape (not shown) is visible. Suitable reference points such as pointers 66A and 68A are fixedly secured to the top surface of the bracket 140 in alignment with the axis of the pivot 152.

A wiper 158 is mounted to the upper bracket 140 transverse to the axis of the pivot 154. As seen in FIG. 9, the wiper 158 projects upwardly from the upper surface of the bracket 140. Any suitable wiper may be utilized, however, a felt cord has been found to provide the wiper action needed, as will be described hereinbelow. The upper bracket 140 is formed with a pair of apertures 160 (FIG. 11) through which each end of the felt wiper 158 is forced. It should be noted that the diameter of the apertures 160 is slightly less than the diameter of the wiper 158 such that the ends of the wiper must be forced through the apertures. This in turn provides a tight fit and securely holds the wiper 158 in place.

The legs 144 and 148 are each formed with a web portion 162 and 164, respectively. When the upper pulley subassembly 24A is mounted in the adapter body subassembly 120, the upper bracket 140 is rotated until the webs 162 and 164 engage a pair of the channels 132, 136, or 134, 138 of the neck 126. Engagement of the webs with the respective pair of channels prevents rotation of the upper pulley subassembly 24A relative to the adapter body subassembly 120.

When the upper pulley subassembly 24A has been mounted in the adapter body subassembly 120, the body and cap subassembly 22A is rotatably mounted on the subassembly 120. As seen in FIG. 6, the subassembly 22A is comprised of a body 32A having a stepped internal bore 166 slightly larger than the external diameter of the neck 126. In order to mount the subassembly 22A on the subassembly 120, the screws 130 must be in the fully retracted position such that they do not protrude into the bore 166. Once the subassembly 22A is mounted over the neck 126 of the subassembly 120, as seen in FIG. 5, the screws 130 are threaded inwardly until the heads thereof seat themselves on the flat surface of body 32A and ends clear flat surface 128 of the annular groove 125. It should be noted that even with the screws 130 in engagement with the flat surface of body 32A, the subassembly 22A is freely rotatable about the neck 126. O-ring 168 (FIG. 7) forms an airtight seal between the subassembly 120 and the rotatable subassembly 22A. The sight glass 38A is securedly mounted in the subassembly 22A by any suitable means 40A, such as an epoxy or the like, so as to provide an airtight seal. In operation, it has been found that condensate may accumulate on the underside of the sight glass 38A which interferes with proper reading of the indicating tapes. In order to remove the condensate in the present embodiment, it is only necessary to rotate the body and cap subassembly 22A about the neck 126. In the mounted position the felt wiper 158 engages the bottom surface of the sight glass 38A. Thus, rotation of the subassembly 22A will cause a relative wiping of the underside of the sight glass 38A by the wiper 158. The subassembly 22A may not be removed from the adapter body subassembly 120 because of the cooperative engagement of the ends of the screws 130 with the annular groove or channel 125.

Figure 12:
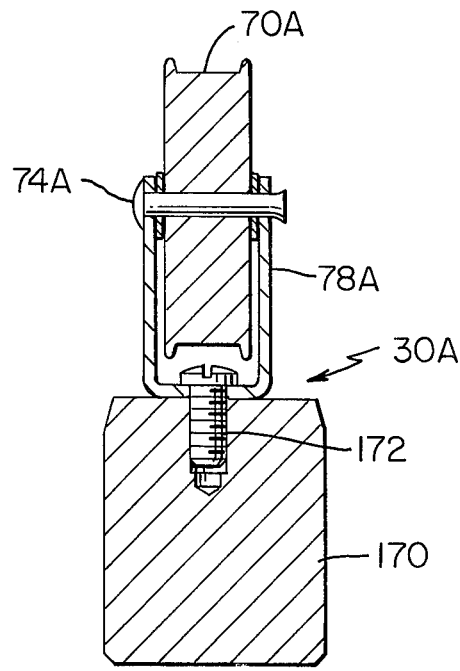
FIG. 12 is a sectional view of the lower pulley subassembly when only a single pulley is utilized.

In some instances it may be desirable only to provide a single indication. Thus, only one pulley is required in the upper pulley subassembly. To insure that the indicating tape (not shown) hangs in a plumb condition, a single pulley 70A is rotatably mounted in the lower pulley subassembly 30A, as seen in FIG. 12. In this instance, a mounting bracket 78A is secured to a weight 170 by suitable means such as a screw or the like 172. The pulley 70A is rotatably mounted to the bracket 78A by a pivot pin or rivet 74A. Suitable washers provide spacing between the pulley 70A and the bracket 78A in a known manner. The weight 170 may be of any suitable material and is formed of a solid mass. The weight of the pulley 170 may be calculated so as to provide stability for the system and will insure that the indicating tape will hang in a plumb condition.

Referring once again to FIGS. 1 and 4, it is seen that the bails 92 are secured to the indicating tape 90 by clamp 96 and set screw 98. To assist in the mounting of the bails to the tape it has been found to be of assistance to provide rectangular apertures (not shown) in the slanted portion of the bail 92 in a plane horizontal with the axis of the set screw 98. Thus, the Hex key or the like may be inserted through the aperture so as to more easily engage the set screw 98. The indicating gauge hereinabove described has been directed to a specific embodiment for use in an underground gasoline storage tank. Accordingly, the materials used therein must be sufficient to resist the effects of the gasoline. As an example, the body and cap are of a hard coated aluminum construction, the tapes are steel with a gasoline and water resistant coating thereon and the floats are of a closed cell buna-N material, said floats having a molded outer skin. To facilitate hard usage, the viewing window is constructed of an impact resistant plastic. It should be further noted that this indicating gauge is mounted in an opening to the underground tank which is not used for any other purpose, i.e., filling or venting.

Should other liquids be used in the storage tank, other materials may of necessity be used.

It can be seen that a liquid level indicating gauge has been provided which permits the direct reading of the surface level of the liquids within the tank. The indicating gauge is of simple and economical construction, is reliable and accurate in its measurement. The floats are responsive to the change in surface level of its respective fluid. Accordingly, the objectives hereinabove set forth have been accomplished.

While exemplary embodiments of this invention have been illustrated and described, it will be recognized that this invention may be othewise variously embodied and practiced by those skilled in the art.

What is claimed is:

1. A dual level indicating gauge for indicating the respective surface levels of two liquids of different specific gravities within the same container comprising a pair of measuring tapes, each tape forming a tape loop, a first pair of tape pulleys carrying one tape loop, a second pair of tape pulleys carrying the second tape loop, each pair of tape pulleys having an upper and lower pulley spaced apart by the distance of the tape loop, means rotatably supporting the first and second upper pulleys above the liquid, second means rotatably supporting the first and second lower pulleys in the liquid having the higher specific gravity, weight means connected with said second means to maintain a tension on the tape loops, float means individually secured to each tape loop, each float means having a specific gravity so that one of the float means will float at the surface level of each respective liquid wherein said respective measuring tapes will be moved about the respective pairs of pulleys to provide an indication of the level of the respective liquids.

2. The indicating gauge as set forth in claim 1 further comprising viewing means connected with said supporting means to permit viewing of the measuring tapes therethrough.

3. The indicating gauge as set forth in claim 2 in which said supporting means includes a bracket for rotatably carrying said first and second upper pulleys and further comprising a pair of index pointers positioned adjacent said pulleys to provide a reference point for reading the dimensions of the respective measuring tape.

4. The indicating gauge as set forth in claim 3 in which said second means comprises a bracket for rotatably carrying said first and second lower pulleys thereon, a rivet protruding therefrom for supporting said weight means thereon.

5. The indicating gauge as set forth in claim 4 in which each float means includes an elongated cylindrical float, a bail pivotally carrying said float, and in which each said bail is secured to a respective tape.

6. The indicating gauge as set forth in claim 5 in which the pivotal connection between each respective bail and float is displaced axially therealong the float wherein said float will rotate to a vertical position when not suspended in a liquid.

7. The indicating gauge as set forth in claim 6 in which each of said floats is a molded closed cell buna-N material.

8. A dual lever indicating gauge for use in indicating the respective surface levels of water and gasoline contained in an underground storage tank in which the tank includes an opening port and riser pipe to adjacent the ground surface, the indicating gauge comprising a bracket for mounting on the upper end of the riser pipe, a pair of pulleys rotatably supported by said bracket, a second pair of pulleys, a second bracket rotatably carrying said second pair of pulleys, a pair of measuring tapes, each tape defining a tape loop, each tape loop being carried by a respective upper and lower pulley of said pulley pairs, weight means connected to said second bracket to maintain a tension on the respective tape loops, said weight means being suspended adjacent the bottom of the underground storage tank, a first float having a specific gravity to float in gasoline secured to one of said tape loops, a second float having a specific gravity fo float in water being secured to the other tape loop wherein said floats will position themselves at the surface level of the respective gasoline and water surfaces whereby the respective tapes will provide an indication of the surface level of the respective liquids.

9. The indicating gauge as set forth in claim 8 further comprising seal means coacting between said first bracket and the end of the riser and a cap mountable over said first bracket and engageable with said riser to securely mount said first bracket.

10. The indicating gauge as set forth in claim 9 in which said first bracket includes a pointer means adjacent said tape loops to provide a reference point for viewing the respective measuring tapes.

11. The indicating gauge as set forth in claim 10 further comprising a pair of bails, each bail being respectively pivotally connected to said first and second floats, said bails being secured to a respective tape loop for carrying said float relative thereto.

12. The indicating gauge as set forth in claim 11 in which each of said floats is an elongated cylindrical member and in which the pivotal connection between said float and the respective bail is linearly displaced along the axis of each respective float wherein said float will rotate to the vertical position in air and will float in a horizontal position in the liquid.

13. The indicating gauge as set forth in claim 12 in which the gasoline floatable float and bail are mounted on the inside of the respective tape loop and in which the water floatable float and bail are secured on the outside of the other tape loop.

14. The indicating gauge as set forth in claim 13 further comprising a clamp for securing said gasoline float carrying bail to the tape loop at a second position to prevent wandering of the float in the liquid.

15. The indicating gauge as set forth in claim 14 further comprising a sight disc carried by said first bracket and sealing means coacting therewith to provide an airtight seal, said sight disc being positioned above said index pointers.

16. A level indicating guage for use in indicating the surface level of at least one of the liquids of different specific gravities contained in a storage tank in which the tank includes an opening port and a riser pipe to adjacent the ground surface, the indicating guage comprising an adapter for mounting on the upper end of the riser pipe, first pulley means rotatably supported by said adapter, a bracket, second pulley means rotatably carried by said bracket, measuring means defining an endless loop carried by said respective first and second pulley means, weight means connected to said bracket to maintain a tension on said loop, said weight means being suspended adjacent the bottom of the storage tank in spaced relation thereto, float means pivotally mounted on said loop, said float means having a specific gravity to float at the surface level of one of the liquids wherein said float means will float at the surface level of the one liquid whereby the measuring means will provide an indication of the surface level of the one liquid, a cap body having a bore therethrough, said bore being of a greater diameter than said adapter wherein said cap body is rotatably mounted over one end of said adapter, means rotatably securing said cap body in engagement with said adapter to prevent removal thereof, sight means secured in said cap body bore to permit viewing of said measuring means therebelow, wiper means supported by said adapter, said wiper means engaging the lower surface of said sight means wherein rotation of said cap body relative to said adapter will cause said sight means to be wiped clean by said wiper means, an upper bracket rotatably supporting said first pulley means, said upper bracket including a horizontal member for fitting within said adapter, a plurality of supporting legs extending downwardly from said member, said first pulley means being carried by said legs, at least one viewing aperture formed in said horizontal member to permit viewing of said measuring means therethrough, and web members extending respectively from at least two legs to said horizontal member and in which said adapter is formed with web receiving channels to fixedly secure said upper bracket against rotation within said adapter.

17. The indicating gauge as set forth in claim 16 in which said wiper means is a felt cord, means for securing said cord to the upper side of said horizontal member wherein said cord projects upwardly therefrom to enage the lower surface of said sight means.

18. A level indicating gauge for use in indicating the surface level of at least one of the liquids of different specific gravities contained in a storage tank in which the tank includes an opening port and a riser pipe to adjacent the ground surface, the indicating gauge comprising an adapter for mounting on the upper end of the riser pipe, first pulley means rotatably supported by said adapter, a bracket unconnected to said adapter, second pulley means rotatably carried by said bracket, measuring means defining an endless loop carried by said respective first and second pulley means, said loop having level indicating indicia thereon, weight means connected to said bracket to maintain a tension on said loop, said weight means being suspended adjacent the bottom of the storage tank in spaced relation thereto, float means pivotally mounted on said loop, said float means having a specific gravity to float at the surface level of one of the liquids wherein said float means will float at the surface level of the one liquid whereby the measuring means will provide an indication of the surface level of the one liquid, a cap body having a bore therethrough, said bore being of a greater diameter than said adapter wherein said cap body is rotatably mounted over one end in said adapter, means rotatably securing said cap body in engagement with said adapter to prevent removal thereof, sight means secured in said cap body bore to permit viewing of said level indicating indicia on said loop therebelow, wiper means supported by said adapter, said wiper means engaging the lower surface of said sight means wherein rotation of said cap body relative to said adapter will cause said sight means to be wiped clean by said wiper means.

* * * * *